(12) United States Patent
Turek et al.

(10) Patent No.: US 12,078,261 B2
(45) Date of Patent: Sep. 3, 2024

(54) COMPLIANT JOINT DRIVE ASSEMBLY

(71) Applicant: Goodrich Corporation, Charlotte, NC (US)

(72) Inventors: Lukasz Turek, Wroclaw (PL); Modest Adam Reszewicz, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 197 days.

(21) Appl. No.: 17/586,074

(22) Filed: Jan. 27, 2022

(65) Prior Publication Data

US 2022/0260173 A1    Aug. 18, 2022

(30) Foreign Application Priority Data

Feb. 15, 2021    (EP) ..................................... 21461514

(51) Int. Cl.
*F16K 31/04* (2006.01)
*B64D 47/00* (2006.01)
*F16D 3/24* (2006.01)
*F16K 5/06* (2006.01)

(52) U.S. Cl.
CPC ............ *F16K 31/047* (2013.01); *B64D 47/00* (2013.01); *F16D 3/24* (2013.01); *F16K 5/0647* (2013.01); *F16K 31/041* (2013.01); *F16D 2250/0084* (2013.01)

(58) Field of Classification Search
CPC ..... F16K 31/047; F16K 31/041; B64D 47/00; F16D 3/24; F16D 2250/0084; F16D 5/0647
USPC .................................................... 251/129.11
See application file for complete search history.

(56) References Cited

U.S. PATENT DOCUMENTS

| | | | | |
|---|---|---|---|---|
| 1,825,042 A | * | 9/1931 | Baldwin, Jr. | B21K 1/24 |
| | | | | 29/890.132 |
| 2,239,045 A | * | 4/1941 | Leighton | B21K 1/06 |
| | | | | 72/372 |
| 2,989,857 A | | 6/1961 | Helland et al. | |
| 3,837,179 A | | 9/1974 | Barth | |
| 7,717,397 B2 | * | 5/2010 | Campany | F16D 3/68 |
| | | | | 464/154 |
| 8,172,198 B2 | * | 5/2012 | Dorsey | F16K 31/047 |
| | | | | 251/71 |

(Continued)

FOREIGN PATENT DOCUMENTS

DE    102013007126 A1    6/2014
DE    102018110485 A1 *  11/2019

(Continued)

OTHER PUBLICATIONS

Translation of DE 102018110485, Nov. 2019, De, Schiek W.*

(Continued)

*Primary Examiner* — William M McCalister
(74) *Attorney, Agent, or Firm* — CANTOR COLBURN LLP

(57) ABSTRACT

A dielectric insulating insert assembly arranged to be positioned between a drive shaft and a driven shaft of a motorised drive assembly, the insert assembly comprising a plurality of elongate pins of dielectric material configured to engage, respectively, with the drive shaft and the driven shaft in torque transfer engagement, the pins providing a dielectric barrier between the drive shaft and the driven shaft.

7 Claims, 7 Drawing Sheets

(56) References Cited

U.S. PATENT DOCUMENTS

| | | | | |
|---|---|---|---|---|
| 2001/0001935 | A1* | 5/2001 | Wilk, Jr. | B23B 5/168 82/123 |
| 2008/0041476 | A1* | 2/2008 | Campany | F16K 31/045 137/870 |
| 2013/0091991 | A1* | 4/2013 | Lee | B21K 5/00 76/119 |
| 2018/0087579 | A1* | 3/2018 | Zika | C04B 35/10 |
| 2019/0360467 | A1* | 11/2019 | Bager | F16D 1/0876 |
| 2023/0287939 | A1* | 9/2023 | Reszewicz | F16D 1/101 251/129.11 |

FOREIGN PATENT DOCUMENTS

| | | |
|---|---|---|
| GB | 575163 A | 2/1946 |
| GB | 848151 A | 9/1960 |

OTHER PUBLICATIONS

Abstract for DE102013007126 (A1), 1 page.
Abstract for DE102018110485A1, 1 page.
European Search Report for Application No. 21461514.8, mailed Jul. 23, 2021, 9 pages.

* cited by examiner

COMPLIANT JOINT DRIVE ASSEMBLY

CROSS-REFERENCE TO RELATED APPLICATIONS

This application claims priority to European Patent Application No. 21461514.8 filed Feb. 15, 2021, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor which moves the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a dielectric insulating insert assembly arranged to be positioned between a drive shaft and a driven shaft of a motorised drive assembly, the insert assembly comprising a plurality of elongate pins of dielectric material configured to engage, respectively, with the drive shaft and the driven shaft in torque transfer engagement, the pins providing a dielectric barrier between the drive shaft and the driven shaft.

The assembly may further comprise mating interfaces at the drive shaft and the driven shaft shaped to engage with the pins in torque transfer engagement.

The mating interfaces may comprise a protrusion shaped to correspond to the shape of the pins provided at one of the drive shaft or the driven shaft and a recess shaped to correspond to receive the pins and the protrusion provided at the other of the drive shaft and the driven shaft.

The recess may define inner recess portions configured to receive the pins and protrusion is configured to tightly within the recess when the pins are received therein, the protrusion defining outer recess portions sized to receive the pins.

The pins may be sized to engage with the drive shaft and the driven shaft such that an air gap is formed between the drive and the driven shaft when the shafts and the pins are assembled together.

The pins may be provided with markings that can be visually identified through the air gap when the shafts and the pins are assembled together.

The insert assembly may be incorporated into a ball shaft assembly comprising a ball shaft, as a driven shaft.

A motor may be arranged to drive the ball shaft via a cam shaft, as a drive shaft, the pins located between and in torque transfer engagement with the ball shaft and the cam shaft.

A water system incorporating the assembly is also disclosed.

Also disclosed is a method of manufacturing such an assembly, comprising selecting a rod of dielectric material; cutting the rod into sections of a length to form the pins, chamfering the ends of each section, mounting a plurality of the pins into a recess of a driven shaft, assembly a drive shaft to the driven shaft, the drive shaft having a protrusion that extends into the recess to secure the pins.

Preferred embodiments will now be described by way of example only, with reference to the drawings.

DETAILED DESCRIPTION

Figure 1:
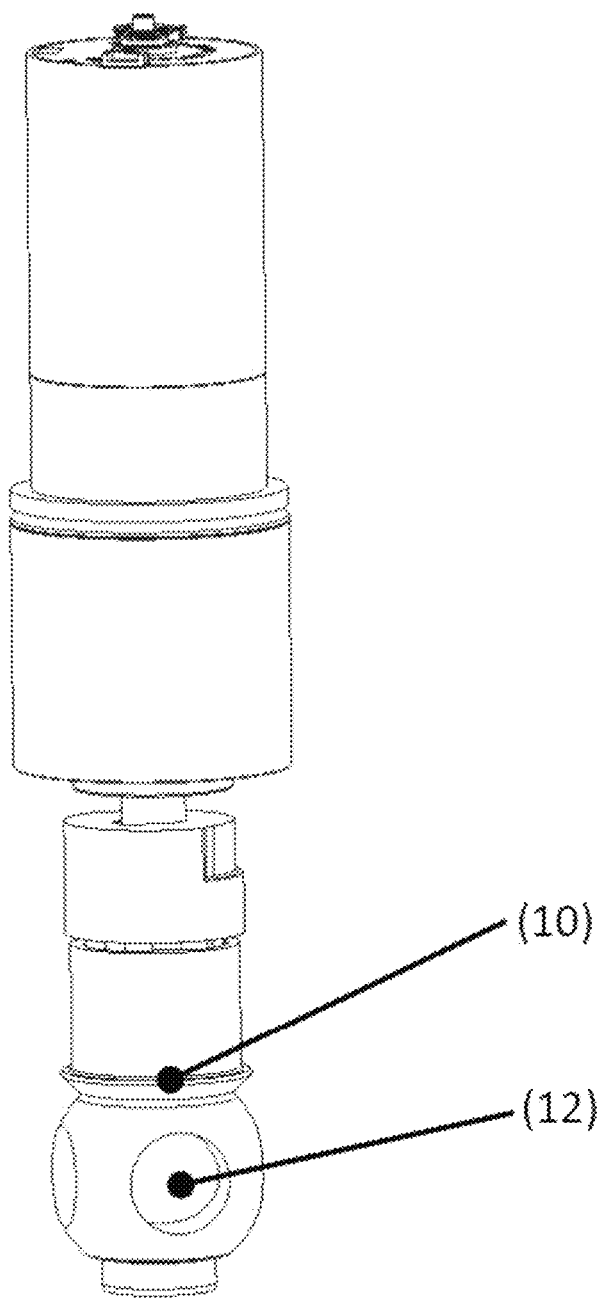
FIG. 1 is a perspective view of a motor driven ball valve assembly that can comprise an insert according to this disclosure.

FIG. 1 is a perspective view of a motorised ball valve assembly including a dielectric insulation component according to the present disclosure.

The operational part of the valve comprises a ball shaft 10 having a head part 11a defining a hole 12 therethrough defining a flow passage, and a shaft part 11b extending from the head for engagement with a drive part of the assembly. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft.

Figure 2:
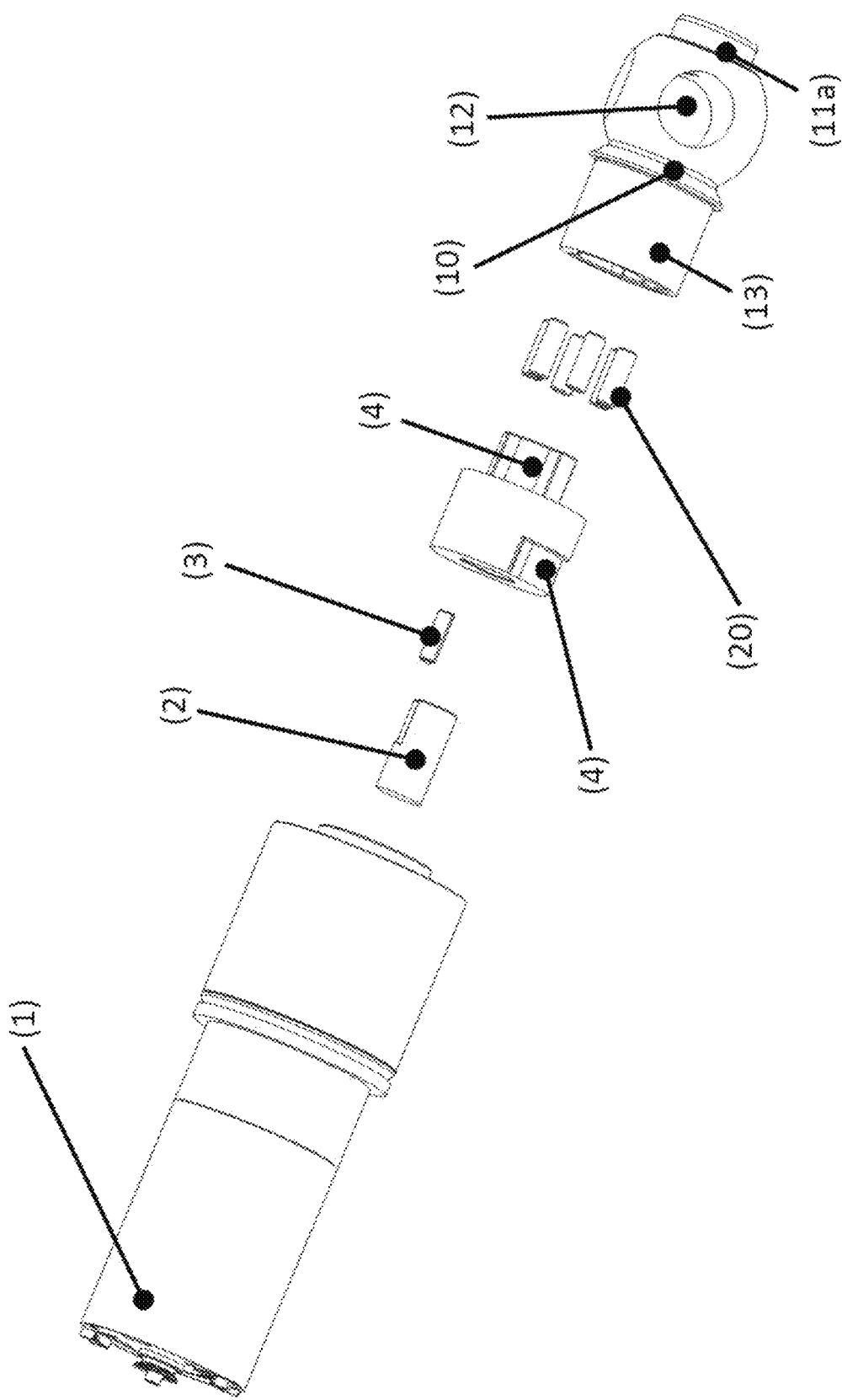
FIG. 2 is an exploded view of the assembly of FIG. 1 according to the disclosure.

In a motorised ball valve, the ball shaft is rotated by means of an electric motor 1. The electric motor 1 drives a cam shaft 4 which engages with the ball shaft 10. In the example shown (see FIG. 2) the cam shaft 4 is provided with a key feature 3 that engages with a D-shaft 2—i.e. a D-shaped shaft component extending from the motor. Rotation of the motor 1 causes rotation of the D-shaft 2 which, in turn, rotates the cam shaft 4 which rotates the ball shaft 10. Seals e.g. O-rings (not shown) are provided around the ball shaft 10 to prevent water passing into the electric part of the assembly. The cam shaft may be provided with indicators such as microswitches (not shown) which can be mounted in recesses or races on the cam shaft 4, or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle (not shown) may be provided in close fitting arrangement around the ball shaft so that manual operation of the handle can rotate the ball shaft 10. The handle can be fitted to the ball shaft such that there is a form fitting or frictional engagement between them. Alternatively, a fixing element e.g. a locking pin (not shown) may be provided to secure the handle to the shaft.

As mentioned above, to provide the required strength and to satisfy other standards such as safety, life and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator insert assembly 20 to be fitted between the ball shaft 10 (or, more generally, driven end) and the electric motor 1 (or, more generally, drive end).

The dielectric insulation insert is structured to have dielectric properties and is shaped and configured to provide torque transmission from the electric motor 1 to the ball shaft 10. The insert should be such as to be able to withstand a short torque peak if the ball shaft end is fixed or blocked.

The insert according to the disclosure forms a dielectric barrier between the drive and the driven ends of the assembly from the combination of a plurality of pins of dielectric material and an air gap The insert assembly comprises a plurality of pins each of which is a simple, re-usable component easily manufactured from a readily available source material which can be appropriately shaped and then easily slotted and secured between the cam shaft (or, more generally drive end) and the ball shaft (or, more generally, driven end) to ensure reliable torque transfer between the ends. In an example, particularly for use in wet or harsh environments, all of the components required for torque transfer are made of steel, particularly stainless steel expect for the dielectric insert pins 21 which function as a dielectric barrier between the steel parts.

With reference to the drawings, a dielectric barrier is provided between the ball shaft and the cam shaft, in the form of a plurality of pins 21 of dielectric material which are fitted into a recess 14 formed in the shaft part 11b of the ball shaft 10. The cam shaft is provided with an interface in the form of a protrusion 15 which is shaped to fit into the recess 14 and to fit around the pins 21 mounted in the recess 14 to form a tight, torque transfer engagement between the protrusion, the ball shaft and the pins. The length L of the pins 21 is slightly greater than the depth d of the recess 14 such that when the pins are located in the recess an end of the pins extends axially beyond the recess 14 such that when the cam shaft is fitted with its protrusion into the recess, the extending end of the pins prevents the cam shaft from abutting directly against the ball shaft, this creating an air gap between the cam shaft 4 and the ball shaft 10 around the extending ends of the pins.

Figure 3:
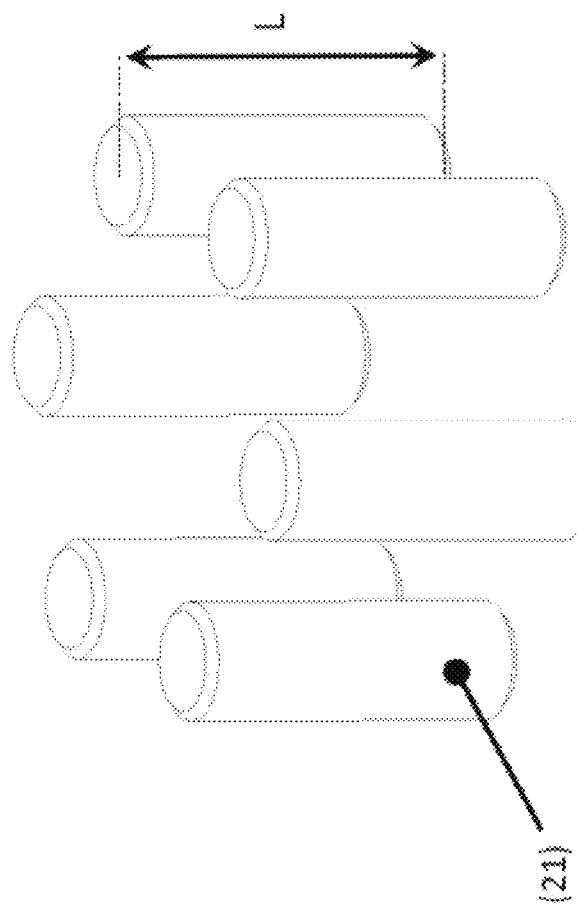
FIG. 3 is a perspective view of one example of a dielectric insulator insert for an assembly in accordance with the disclosure.
Figure 3:
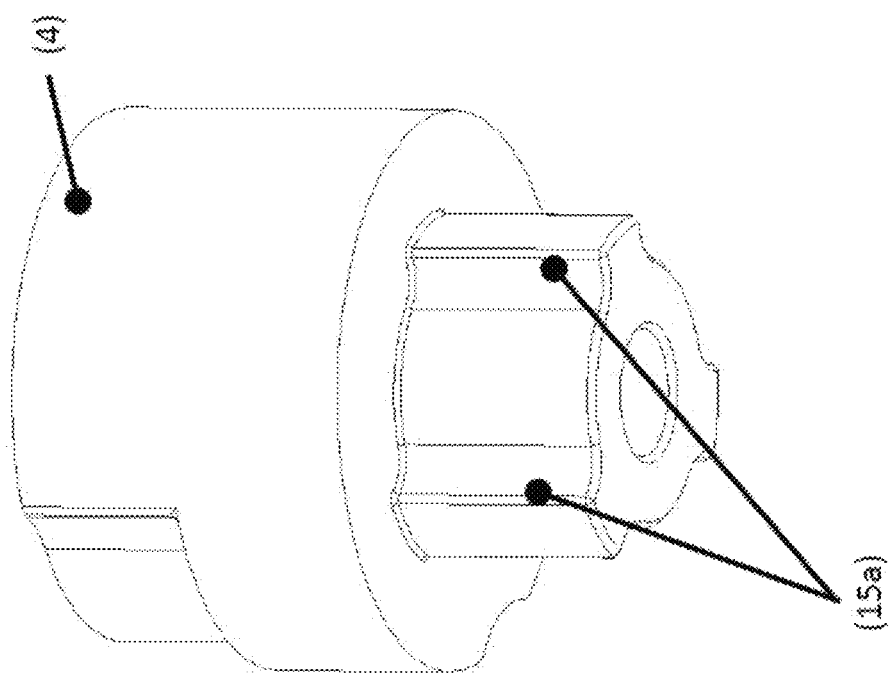
Figure 4:
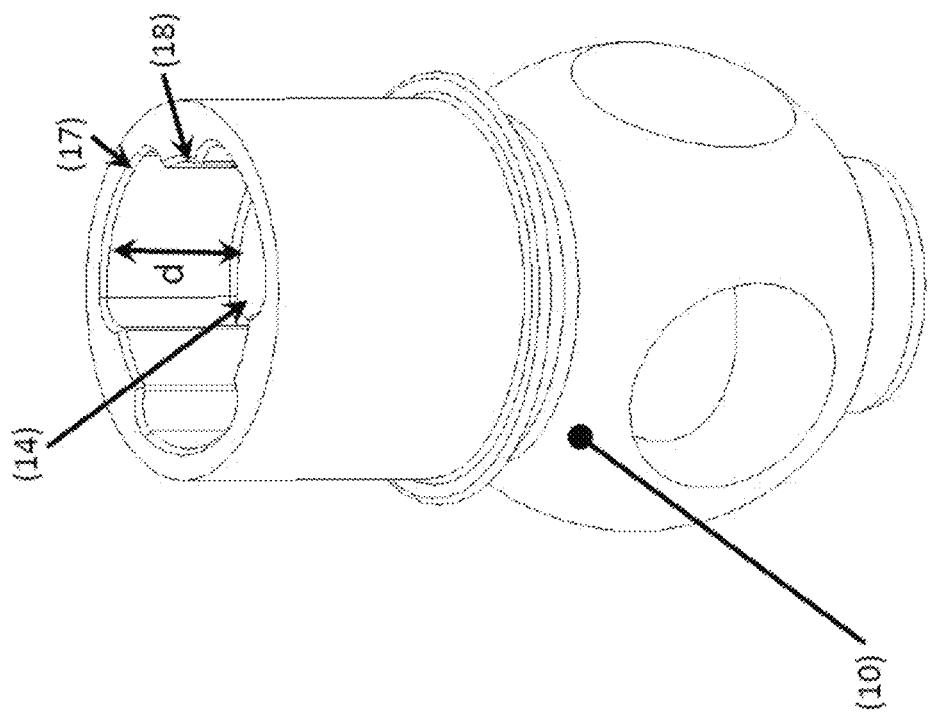
FIG. 4 shows the insert of FIG. 3 from a different perspective.
Figure 4:
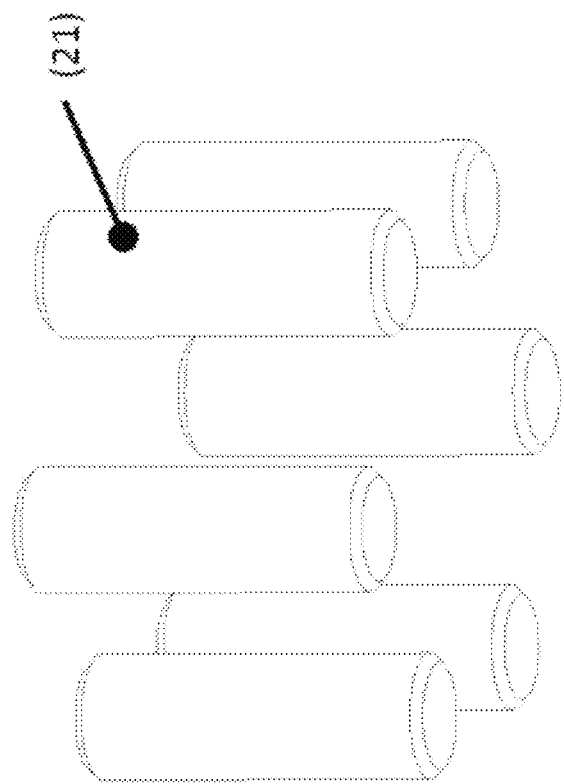

In the example shown in FIGS. 3 and 4, the pins 21 are arranged in pairs 21a, 21b inside the ball shaft recess 14 and the recess 14 is formed to have extended portions 17 of greater radial dimension to each receive two pins 21, the extended portions 17 separated by indented portions 18 of lesser radial dimension. The extended portions are shaped such that a pin 21 will be located at each radial end of each extended portion. The protrusion 15 is then shaped to force the pins out towards the respective radial ends of the extended recess portions when the cam shaft, the pins and the ball shaft are assembled. This can be best seen in FIGS. 5 and 6 using an example of six (three pairs) of pins 21 arranged pair-wise in three extended recess portions 17.

To ensure a tight fit and to minimise the effects of backlash, the diameter of the pins 21 should be the same as the diameter of the receiving parts 15a of the protrusion 15. For simplicity of manufacture and assembly, the pins should be identical in shape and size, although this is not essential and it is envisaged that pins of varying shapes and sizes might be used in some applications. The number, size and shape of the pins can also be varied depending on the application. The example has six circular cylindrical pins, but fewer or more pins might be used and the pins themselves can have different shapes. A particular good torque transfer has been found where the diameter of the pin is very slightly smaller than the diameter of the recess—e.g. a diameter ratio of 0.94 has been found optimal in some applications.

As mentioned above, the dielectric barrier is formed by the combination of the pins and the air gap 16 formed by a portion of the pins extending beyond the ball shaft recess. In one example, a marking e.g. a coloured marker or the like may be provided on the part of the pins that extends from the recess so that this can be seen through the air gap 16. This this provides a visual check that the pins are all in place.

Figure 5:
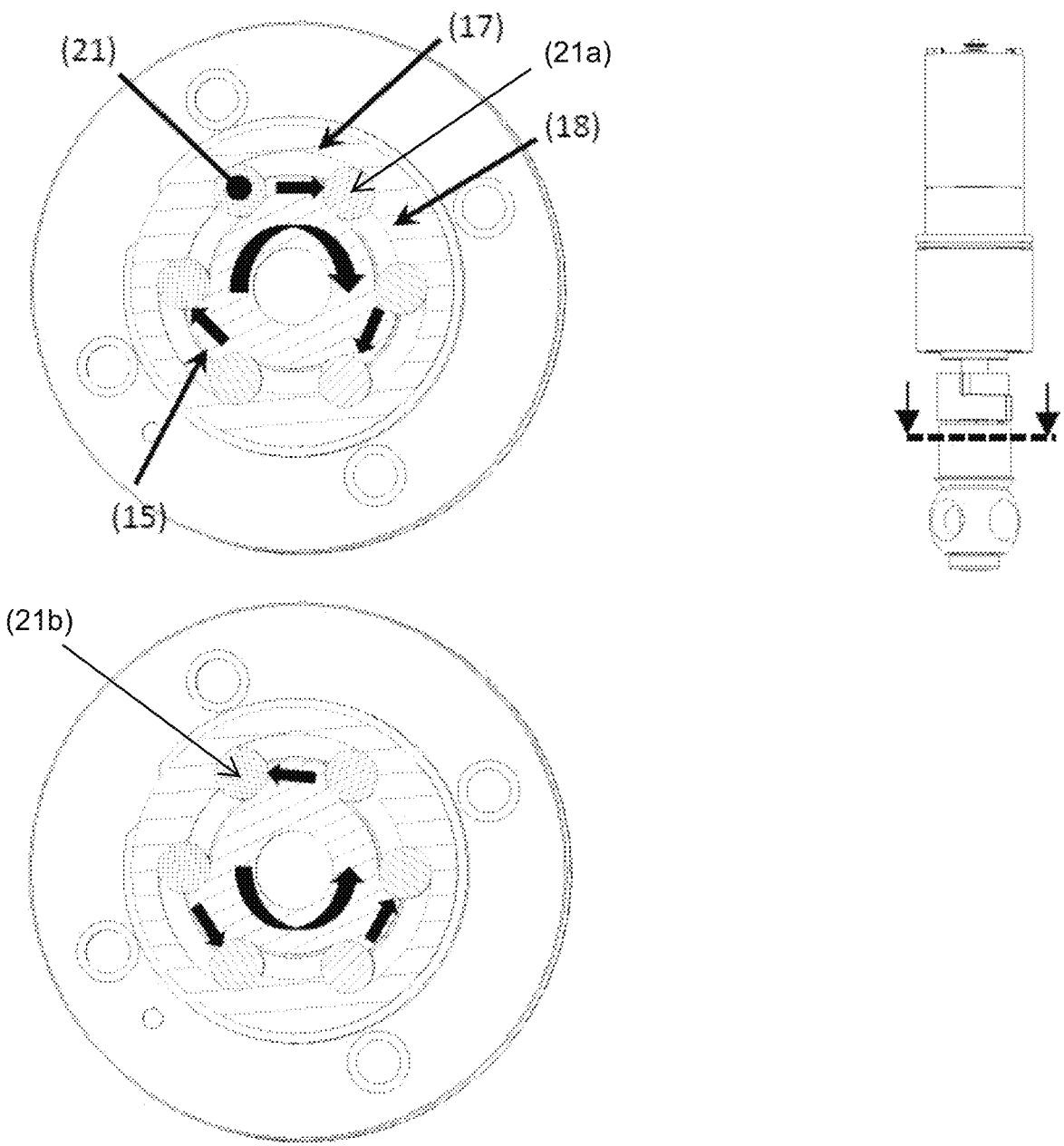
FIG. 5 show the forces acting on the assembly with an insert as shown in FIGS. 3 and 4.
Figure 6:
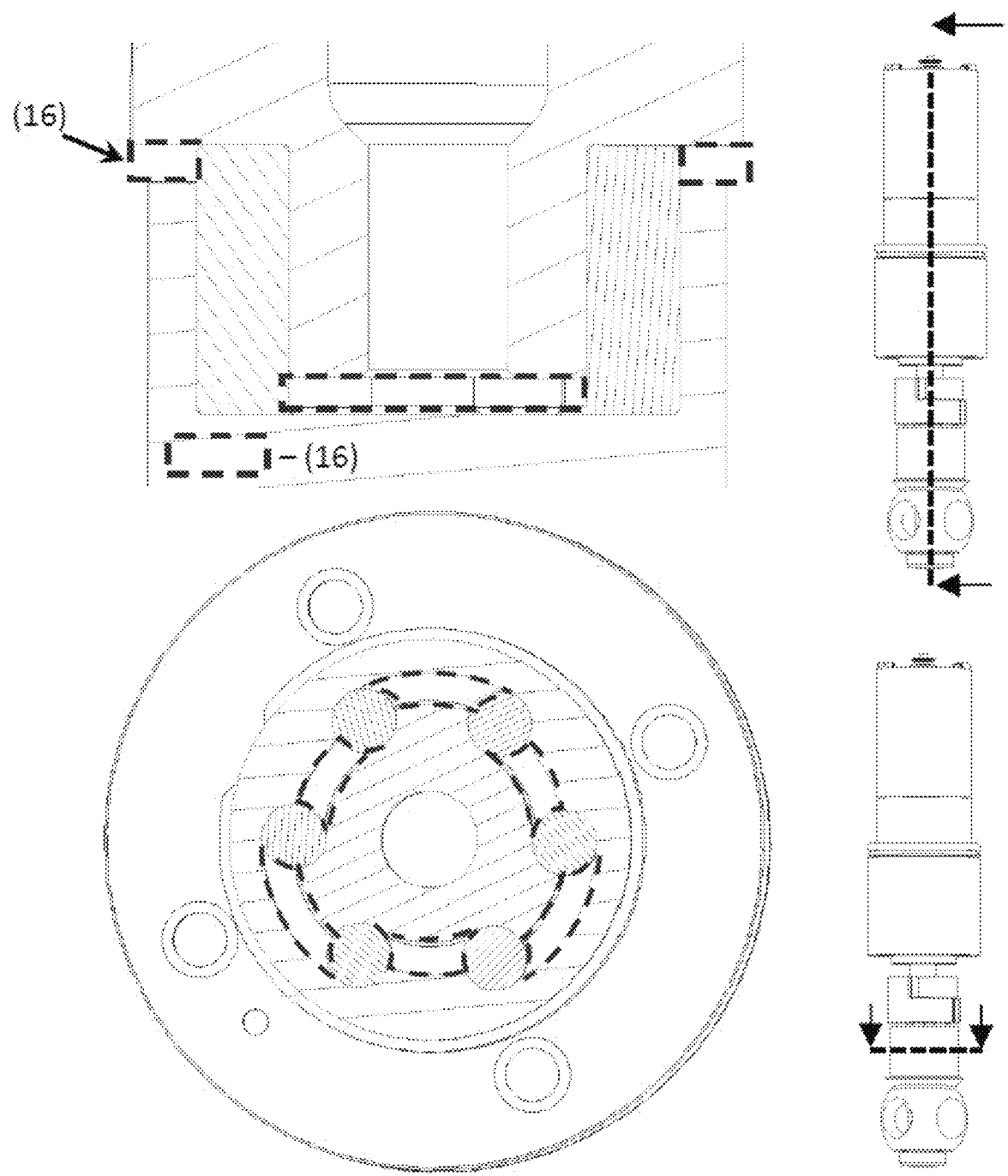
FIG. 6 is a sectional view of an assembly incorporating a dielectric insulator insert such as shown in FIGS. 3 and 4.

The dielectric insulation insert assembly provides electrical insulation between the dry and wet parts of the motorised ball valve assembly whilst ensuring torque transfer between the shafts of the respective parts. The pins must have dielectric properties. Various dielectric materials are known and can be used, for example, but not exclusively, plastic, e.g. PEEK, G10, FR4, G11, FR5 etc., rubber (EPDM), ceramic or aluminium with an oxidized layer on the entire outer surface as a dielectric barrier. The material selected should have superior strength in terms of compression rather than in the tension or shear directions, as the torque is transferred in the compression direction as shown in FIG. 5. Plastic and rubber materials allow the sleeve to buffer vibration or shocks sent by the motor through the system.

The torque loading transfer through the components will be described with reference to FIG. 5. The pins 21 are located pair-wise in recess portions 17 in the ball shaft 10 and secured in place by the shaped protrusion 15 of the cam shaft 4. A clockwise torsional movement of the cam shaft 4 will cause the protrusion 15 to move in the direction of the arrows in FIG. 5A thus causing compression of the one 21a of the pair of pins in each recess towards the right-hand end of the recess portion and not applying compressive force to the other pin of the pair, leaving those pins unloaded. When a counter-clockwise rotation is applied, the other pins 21b of the pairs are compressed as shown in FIG. 5B. This ensures that the torque is transferred by means of compressive loading which suits the materials mentioned above with superior compressive strength.

A particular advantage of the insert assembly of this disclosure is its simplicity and, particularly simplicity of manufacture. An example of how the pins 21 can be manufactured is described with reference to FIGS. 7A to 7D.

Figure 7D:
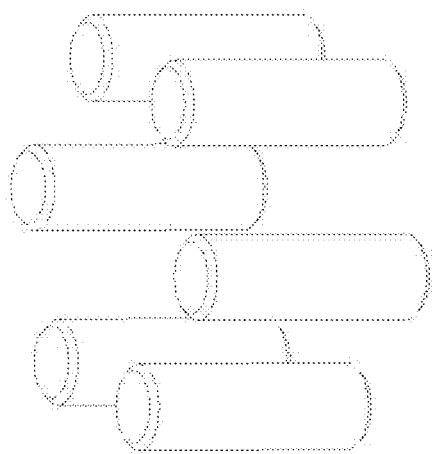
FIGS. 7A to 7D show examples of steps in the manufacture of an insert according to the disclosure.
Figure 7C:
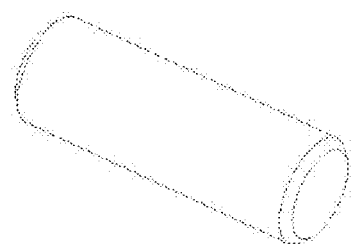
Figure 7B:
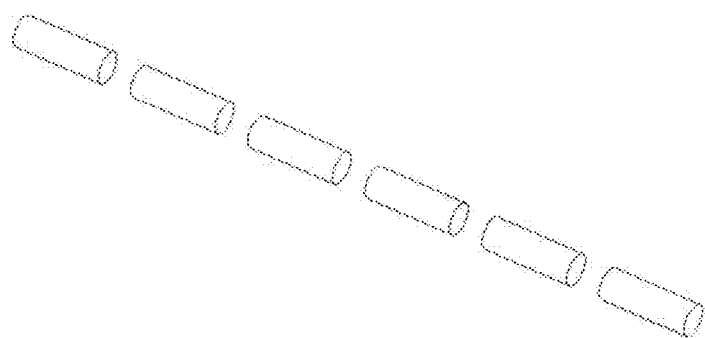
Figure 7A:
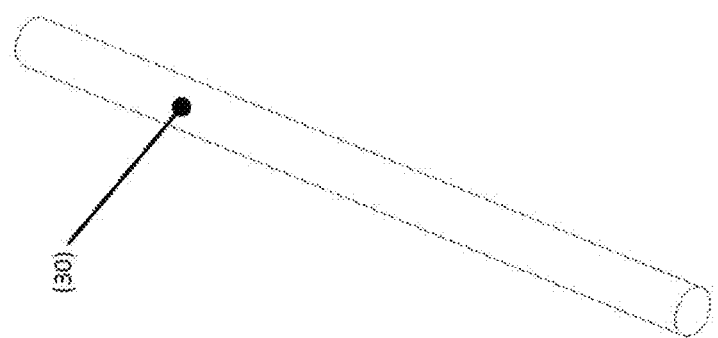

The pins can be made from a readily available source material such as a rod or tube 30 of engineering plastics, ceramic or the like that are generally available in various dimensions off-the-shelf. The rod 30 is then just cut into sections of appropriate length for the pins (FIG. 7B). If a finer finish is required for aesthetic reasons or to provide smoother ends without burrs, the individual pin sections can be chamfered at the ends (FIG. 7C) and the set of pins is ready to be assembled (FIG. 7D).

Assembly of the pins 21 into the recess 14 is simple, precise alignment on insertion is not necessary as the pins will naturally take up the correct position and there is no 'right' orientation for the pins so there is no risk of the pins being inserted the wrong way. The air gap allows visual confirmation that the pins have been inserted at all.

In another example, the recess could be in the cam shaft and the protrusion could be at the interface of the ball shaft.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end. The scope of the invention is as defined by the claims.

The invention claimed is:

1. A ball shaft assembly comprising:
   a ball shaft;
   a cam shaft, wherein the ball shaft is a driven shaft and the can shaft is a drive shaft;
   a motor arranged to drive the ball shaft via the cam shaft; and
   a dielectric insulating insert assembly arranged to be positioned between the drive shaft and the driven shaft, the insert assembly comprising:
   a plurality of elongate pins of dielectric material located between the drive shaft and the driven shaft and configured to engage, respectively, with the drive shaft and the driven shaft in torque transfer engagement, wherein the pins provide a dielectric barrier between the drive shaft and the driven shaft;
   mating interfaces at the drive shaft and the driven shaft shaped to engage with the pins in torque transfer engagement, the mating interfaces comprising:
   a protrusion shaped to correspond to the shape of the pins provided at one of the drive shaft or the driven shaft and a recess shaped to correspond to receive the pins and the protrusion provided at the other of the drive shaft and the driven shaft, wherein the recess defines inner recess portions configured to receive the pins and the protrusion is configured to tightly fit within the recess when the pins are received therein, the protrusion defining outer recess portions sized to receive the pins;
   wherein the pins are sized to engage with the drive shaft and the driven shaft such that an air gap is formed between the drive and the driven shaft when the shafts and the pins are assembled together.

2. The assembly of claim 1, wherein the pins are provided with markings that can be visually identified through the air gap when the shafts and the pins are assembled together.

3. The assembly of claim 1, further comprising:
   a handle to manually rotate the ball shaft.

4. The assembly of claim 1, wherein the motor is an electric motor.

5. A water supply system including:
   the assembly of claim 1.

6. The water supply system of claim 5, wherein the water supply system is an aircraft water supply system on an aircraft.

7. A method of manufacturing an assembly as claimed in claim 1, the method comprising providing the ball shaft assembly of claim 1, including steps of:
   selecting a rod of dielectric material;
   cutting the rod into sections of a length to form the pins;
   chamfering the ends of each section;
   mounting a plurality of the pins into the recess of the driven shaft; and
   assembling the drive shaft to the driven shaft, the assembling including securing the pins in the recess such that the protrusions extend into the recess to secure the pins.

* * * * *